(12) United States Patent
Lee et al.

(10) Patent No.: US 10,041,716 B2
(45) Date of Patent: Aug. 7, 2018

(54) REFRIGERATOR

(71) Applicant: LG ELECTRONICS INC., Seoul (KR)

(72) Inventors: Sangbong Lee, Seoul (KR); Hyoungkeun Lim, Seoul (KR); Myungjin Chung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 129 days.

(21) Appl. No.: 15/030,038

(22) PCT Filed: Jun. 18, 2015

(86) PCT No.: PCT/KR2015/006208
§ 371 (c)(1),
(2) Date: Apr. 15, 2016

(87) PCT Pub. No.: WO2015/194891
PCT Pub. Date: Dec. 23, 2015

(65) Prior Publication Data
US 2016/0252288 A1     Sep. 1, 2016

(30) Foreign Application Priority Data

Jun. 19, 2014  (KR) .................. 10-2014-0074809

(51) Int. Cl.
*F25D 11/02* (2006.01)
*F25B 5/02* (2006.01)
(Continued)

(52) U.S. Cl.
CPC ............ *F25D 11/022* (2013.01); *F16K 11/00* (2013.01); *F25B 5/02* (2013.01); *F25B 41/04* (2013.01);
(Continued)

(58) Field of Classification Search
CPC .......... F25D 11/022; F25B 5/02; F25B 41/04; F25B 41/067; F25B 2500/01;
(Continued)

(56) References Cited

U.S. PATENT DOCUMENTS

| 2008/0190125 | A1 | 8/2008 | Yoshioka et al. |
| 2012/0023981 | A1* | 2/2012 | Chae ...................... F25B 5/02 |
| | | | 62/115 |
| 2014/0053581 | A1 | 2/2014 | Cho et al. |

FOREIGN PATENT DOCUMENTS

| EP | 2 413 068 | 2/2012 |
| EP | 2 703 754 | 3/2014 |

(Continued)

OTHER PUBLICATIONS

International Search Report and Written Opinion dated Sep. 22, 2015 issued in Application No. PCT/KR2015/006208 (Full English Text).

(Continued)

*Primary Examiner* — Marc Norman
(74) *Attorney, Agent, or Firm* — Ked & Associates LLP

(57) ABSTRACT

Provided is a refrigerator. The refrigerator includes a main body including a refrigerating compartment and a freezing compartment, a machine room defined in a lower portion of the main body and in which a base is disposed, a compressor placed on the base to compress a refrigerant, a condenser placed on the base, the condenser being disposed at one side of the compressor, a valve device into which the refrigerant condensed in the condenser is introduced, the valve device including a plurality of discharge parts for discharging the refrigerant, a plurality of expansion devices connected to the plurality of discharge parts, and a plurality of evaporators including a first evaporator and a second evaporator which are connected to the plurality of expansion devices. The valve device is disposed inclined at a set angle toward one (Continued)

discharge part of the plurality of discharge parts with respect to a virtual line that is perpendicular to the base.

14 Claims, 5 Drawing Sheets

(51) Int. Cl.
  *F25B 41/06* (2006.01)
  *F16K 11/00* (2006.01)
  *F25B 41/04* (2006.01)

(52) U.S. Cl.
  CPC ........ *F25B 41/067* (2013.01); *F25B 2500/01* (2013.01); *F25B 2600/2511* (2013.01); *F25B 2700/21174* (2013.01); *F25B 2700/21175* (2013.01)

(58) Field of Classification Search
  CPC .... F25B 2600/2511; F25B 2700/21174; F25B 2700/21175; F16K 11/00
  USPC .......................................................... 62/504
  See application file for complete search history.

(56) References Cited

FOREIGN PATENT DOCUMENTS

| JP | 4380905 | 12/2009 |
|---|---|---|
| JP | 2011-012885 | 1/2011 |
| JP | 2013-256964 A | 12/2013 |
| KR | 10-2004-0085776 | 10/2004 |
| KR | 10-0479733 B1 | 3/2005 |
| KR | 10-2012-0011278 A | 2/2012 |
| KR | 10-2013-0071125 A | 6/2013 |
| KR | 10-1275184 | 6/2013 |
| WO | WO 2005/052468 | 6/2005 |

OTHER PUBLICATIONS

Chinese Office Action dated Feb. 27, 2017 issued in Application No. 201580002228.7 (English translation attached).
European Search Report dated Nov. 30, 2017 issued in Application No. 15810476.0.

* cited by examiner

[Fig. 1]
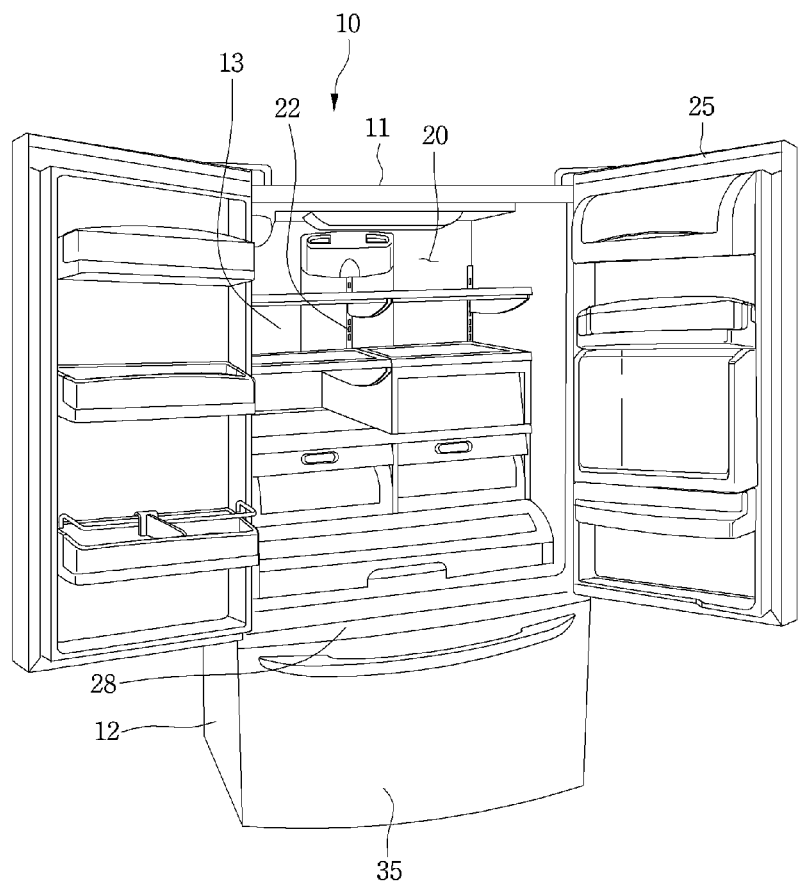

[Fig. 2]
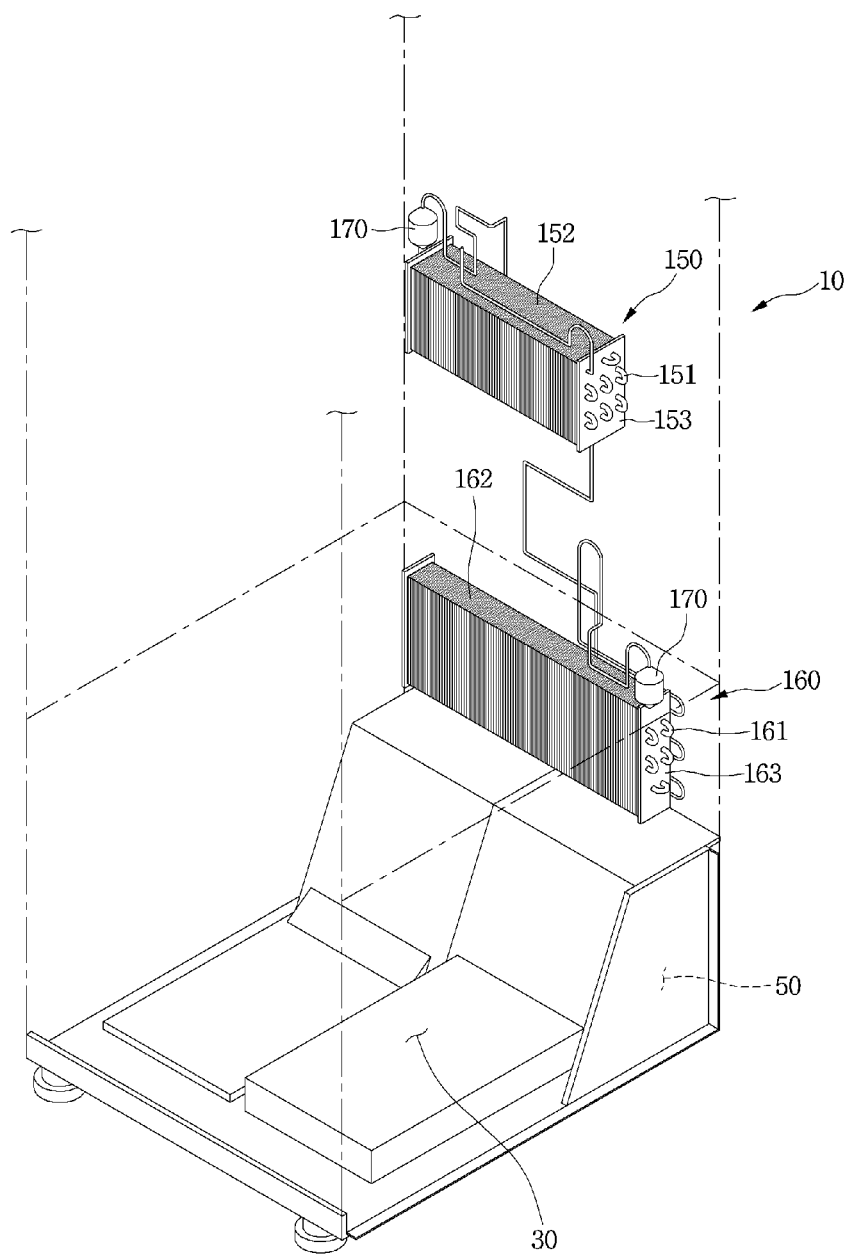

[Fig. 3]
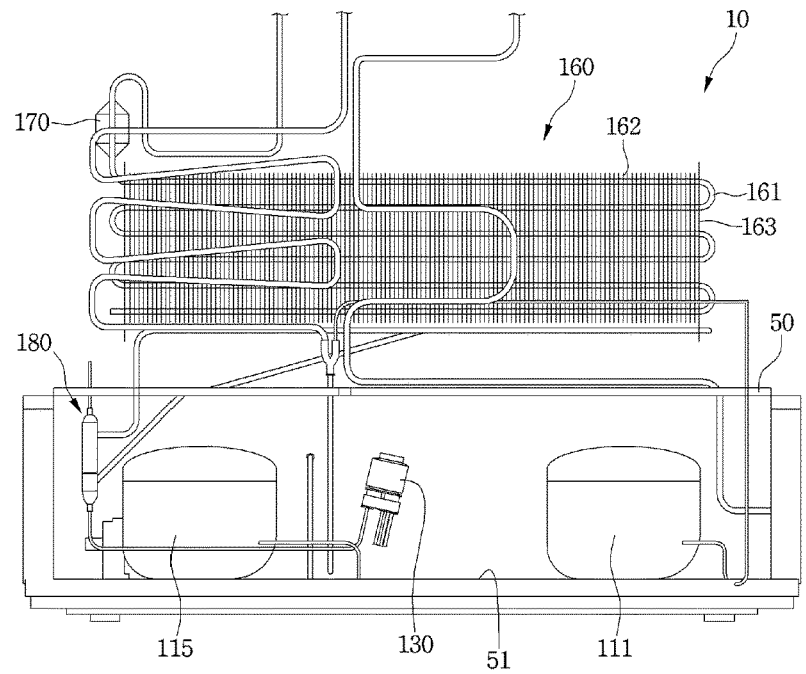
[Fig. 4]
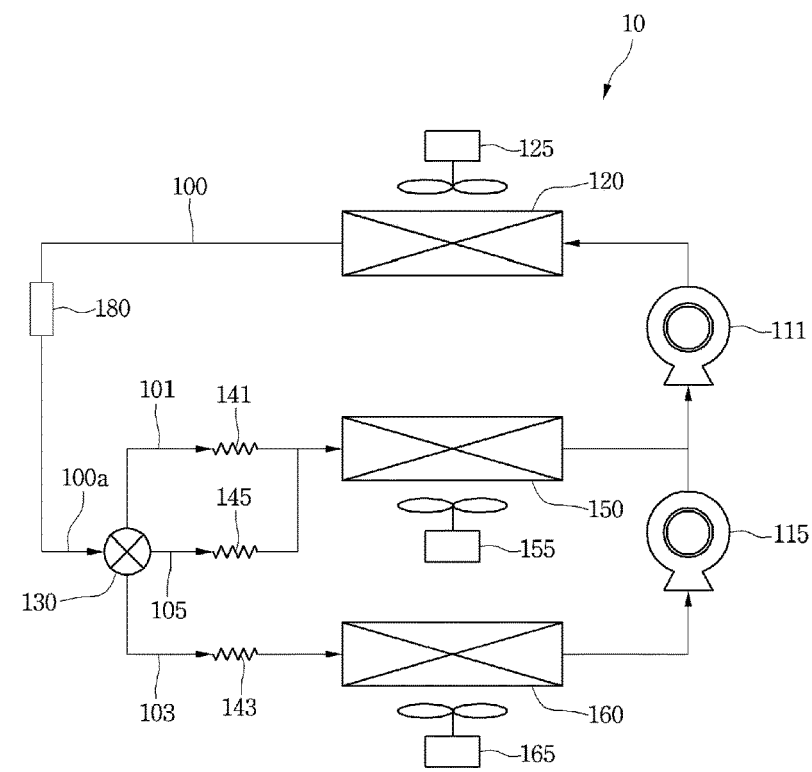

[Fig. 5]
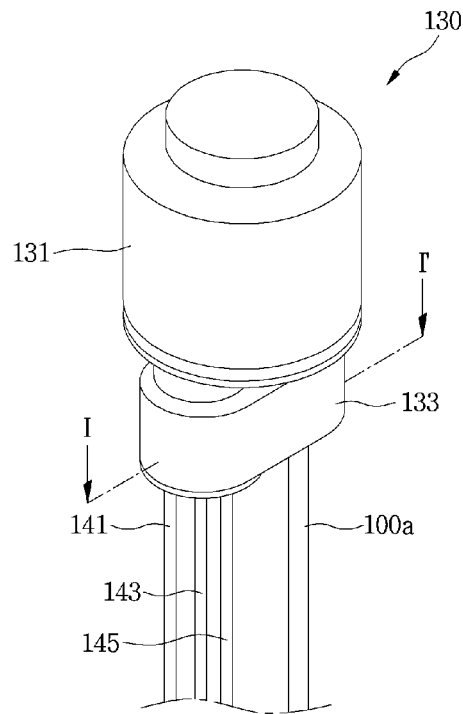
[Fig. 6]
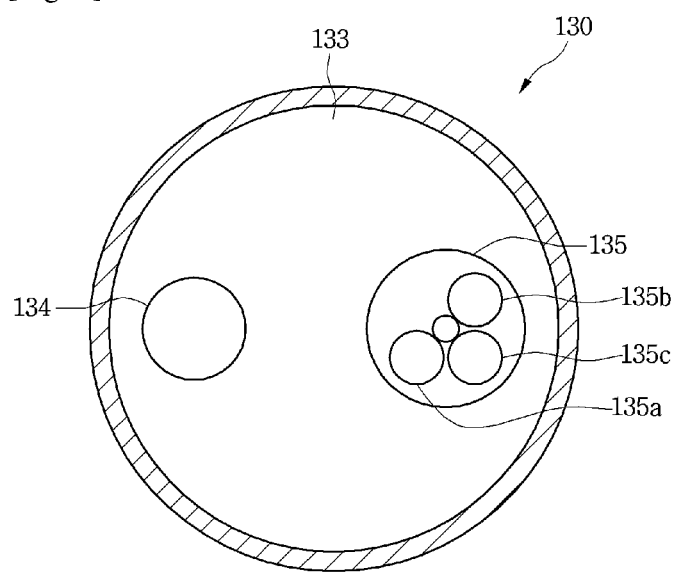

[Fig. 7]
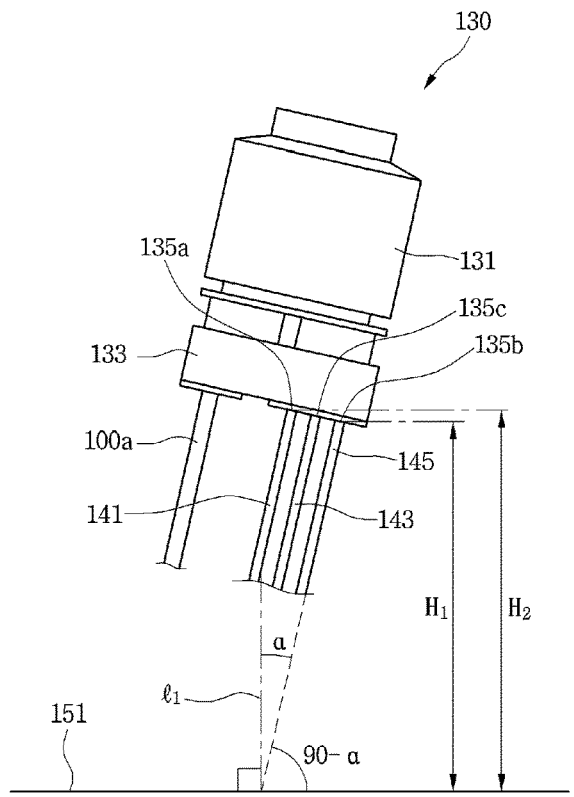
[Fig. 8]
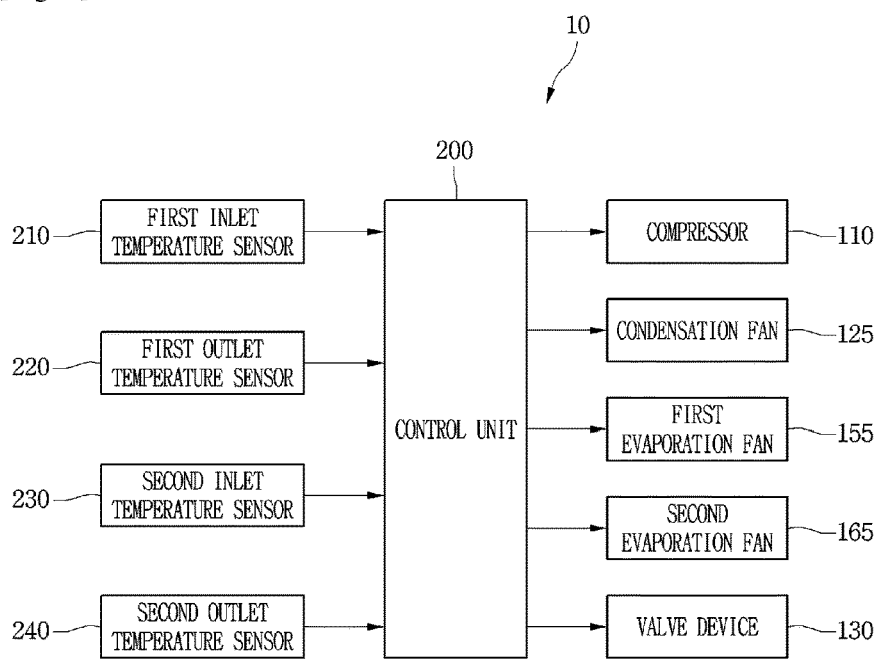

REFRIGERATOR

CROSS-REFERENCE TO RELATED PATENT APPLICATIONS

This application is a U.S. National Stage Application under 35 U.S.C. § 371 of PCT Application No. PCT/KR2015/006208, filed Jun. 18, 2015, which claims priority to Korean Patent Application No. 10-2014-0074809, filed Jun. 19, 2014, whose entire disclosures are hereby incorporated by reference.

TECHNICAL FIELD

The present disclosure relates to a refrigerator.

BACKGROUND ART

In general, a refrigerator has a plurality of storage compartments for accommodating foods to be stored so as to store the foods in a frozen or refrigerated state. Also, the storage compartment may have one surface that is opened to receive or dispense the foods. The plurality of storage compartments include a freezing compartment for storing foods in the frozen state and a refrigerating compartment for storing foods in the refrigerated state.

A refrigeration system in which a refrigerant is circulated is driven in the refrigerator. The refrigeration system may include a compressor, a condenser, an expansion device, and an evaporator. The evaporator may include a first evaporator disposed at a side of the refrigerating compartment and a second evaporator disposed at a side of the freezing compartment.

Cool air stored in the refrigerating compartment may be cooled while passing through the first evaporator, and the cooled cool air may be supplied again into the refrigerating compartment. Also, the cool air stored in the freezing compartment may be cooled while passing through the second evaporator, and the cooled cool air may be supplied again into the freezing compartment.

As described above, in the refrigerator according to the related art, independent cooling may be performed in the plurality of storage compartments through separate evaporators.

In this connection, this applicant has been registered as Patent Registration No. 10-1275184 (Registration Date: Jun. 10, 2013).

The refrigeration system according to the Prior Patent includes a compressor 140, a condenser 150, a refrigerant supply unit 170, expansion devices 113 and 123, a first evaporator 110, and a second evaporator 120. The first and second evaporators 110 and 120 may be understood as heat exchangers that are respectively provided to cool separate storage compartments.

The refrigerant supply unit 170 may be provided as a three-way valve. A refrigerant introduced into the refrigerant supply unit 170 may be guided to the first or second evaporator 110 or 120.

That is, in the prior patent, the refrigerant may be selectively supplied into the first or second evaporator 110 or 120 to cool one storage compartment of the plurality of storage compartments and stop cooling of other storage compartments.

As described above, according to the related art, the plurality of storage compartments may not be cooled at the same time, but be selectively or alternately cooled.

In this case, although the storage compartment in which the cooling is performed is maintained to an adequate temperature, the storage compartment in which the cooling is not performed may increase in temperature and thus be out of a normal temperature range.

Also, in a state where the cooling of one storage compartment is required, if it is determined that the other storage compartment gets out of the normal temperature range, the other storage compartment may be not immediately cooled.

As a result, in the structure in which the storage compartments are independently cooled, the cool air is not supplied at a suitable time and place to deteriorate operation efficiency of the refrigerator.

Also, if all of both outlet sides of the refrigerant supply unit 170 are opened to cool the plurality of storage compartments at the same time, the refrigerant may be concentrated into one evaporator of the plurality of evaporators.

Particularly, when the three-way valve is used as the refrigerant supply unit, it may be difficult to maintain physical equilibrium of the three-way valve, i.e., an inclination of the three-way valve according to the installation state of the three-way valve. As a result, a relatively large amount of refrigerant may be introduced into one evaporator, and a relatively small amount of refrigerant may be introduced into the other evaporator.

DISCLOSURE OF INVENTION

Technical Problem

Embodiments provide a refrigerator in which refrigerant concentration easily occurs when a simultaneous operation of a refrigerating compartment and freezing compartment is performed.

Solution to Problem

In one embodiment, a refrigerator includes: a main body including a refrigerating compartment and a freezing compartment; a machine room defined in a lower portion of the main body and in which a base is disposed; a compressor placed on the base to compress a refrigerant; a condenser placed on the base, the condenser being disposed at one side of the compressor; a valve device into which the refrigerant condensed in the condenser is introduced, the valve device including a plurality of discharge parts for discharging the refrigerant; a plurality of expansion devices connected to the plurality of discharge parts; and a plurality of evaporators including a first evaporator and a second evaporator which are connected to the plurality of expansion devices, wherein the valve device is disposed inclined at a set angle toward one discharge part of the plurality of discharge parts with respect to a virtual line that is perpendicular to the base.

The plurality of discharge parts may include a first discharge part, a second discharge part, and a third discharge part, and the plurality of expansion devices may include a first expansion device connected to the first discharge part, a second expansion device connected to the second discharge part, and a third expansion device connected to the third discharge part.

The first and third expansion devices may be connected to the first evaporator, and the second expansion device may be connected to the second evaporator.

The first evaporator may be configured to cool the refrigerating compartment, and the second evaporator may be configured to cool the freezing compartment.

The set angle may range from about 0° to about 20°.

The second expansion device may have a diameter greater than that of the first expansion device.

The third expansion device may have a diameter greater than that of the second expansion device.

A value obtained by dividing the sum of diameters of the first and third expansion devices by a diameter of the second expansion device may range from about 1.89 to about 2.07.

When the first expansion device has a diameter of about 0.67 mm, and the second expansion device has a diameter of about 0.75 mm, the third expansion device may have a diameter ranging from about 0.75 mm to about 0.85 mm.

When the first expansion device has a diameter of about 0.70 mm, and the second expansion device has a diameter of about 0.75 mm, the third expansion device may have a diameter ranging from about 0.75 mm to about 0.85 mm.

When each of the first and second expansion devices has a diameter of about 0.75 mm, the third expansion device may have a diameter ranging from about 0.75 mm to about 0.80 mm.

The refrigerator may further include: a first inlet temperature sensor detecting an inlet temperature of the first evaporator; a first outlet temperature sensor detecting an outlet temperature of the first evaporator; a second inlet temperature sensor detecting an inlet temperature of the second evaporator; and a second outlet temperature sensor detecting an outlet temperature of the second evaporator.

The refrigerator may further include a control unit for recognizing whether refrigerant concentration into the first or second evaporator occurs according to a ratio of a difference between the temperatures detected by the first inlet temperature sensor and the first outlet temperature sensor to a difference between the temperatures detected by the second inlet temperature sensor and the second outlet temperature sensor.

A capillary tube may be disposed in each of the plurality of expansion devices.

In another embodiment, a refrigerator includes: a main body including a refrigerating compartment and a freezing compartment; a machine room defined in a lower portion of the main body and in which a base is disposed; a compressor placed on the base to compress a refrigerant; a condenser placed on the base, the condenser being disposed at one side of the compressor; a valve device disposed inclined in a set direction with respect to the base, the valve device including a plurality of discharge parts for discharging the refrigerant; two expansion devices connected to a first discharge part and third discharge part of the plurality of discharge parts; one expansion device connected to a second discharge part of the plurality of discharge parts; an evaporator for the refrigerating compartment, which is connected to the two expansion devices; and an evaporator for the freezing compartment, which is connected to the one expansion device, wherein the two expansion devices includes: a first expansion device having a diameter less than that of the one expansion device; and a third expansion device having a diameter greater than that of the one expansion device.

The valve device may be disposed inclined from the first expansion device toward the one expansion device.

A distance (H1) from a central portion of the second discharge part to the base may be less than that (H2) from a central portion of the first discharge part to the base.

A value obtained by dividing the sum of diameters of the first and third expansion devices by a diameter of the second expansion device may range from about 1.89 to about 2.07.

Advantageous Effects of Invention

According to the proposed embodiments, since the evaporators disposed in the refrigerating compartment and the freezing compartment operates at the same time, the simultaneous cooling of the refrigerating compartment and the freezing compartment may be effectively realized.

Also, the number of refrigerant passages connected to the inlet-side of the refrigerating compartment-side evaporator may be greater than that of refrigerant passages connected to the inlet-side of the freezing compartment-side evaporator, and the expansion device may be disposed in each of the refrigerant passages to control the flow of the refrigerant.

Also, the expansion device may be connected to the outlet-side of the valve device, and the valve device may be installed according to the preset inclination. Thus, when the more intense cooling of the freezing compartment is required, the refrigerant concentration into the freezing compartment-side evaporator may be effectively performed.

Also, the flow rate of the refrigerant introduced into the evaporator may be determined on the basis of the temperatures at the inlets and outlets of the refrigerating compartment-side evaporator and the freezing compartment-side evaporator. Furthermore, when the cooling of one of the refrigerating compartment and the freezing compartment is further required, the operation of the valve device may be controlled to realize the refrigerant concentration into one storage compartment, i.e., the refrigerating compartment or the freezing compartment.

Also, since the expansion device has a diameter within the preset valve or range, when the simultaneous operation of the refrigerating compartment and the freezing compartment is performed, the refrigerant concentration into the refrigerating compartment or the freezing compartment may be easily realized.

BRIEF DESCRIPTION OF DRAWINGS

FIG. 1 is a perspective view of a refrigerator according to an embodiment.

FIG. 2 is a partial view of the refrigerator according to an embodiment.

FIG. 3 is a view illustrating rear components of the refrigerator according to an embodiment.

FIG. 4 is a view of a system having a refrigeration cycle in the refrigerator according to an embodiment.

FIG. 5 is a view of a valve device according to an embodiment.

FIG. 6 is a cross-sectional view taken along line I-I' of FIG. 5.

FIG. 7 is a view illustrating a state in which the valve device is installed at a preset inclination according to an embodiment.

FIG. 8 is a block diagram of the refrigerator according to an embodiment.

MODE FOR THE INVENTION

Hereinafter, exemplary embodiments will be described with reference to the accompanying drawings. The invention may, however, be embodied in many different forms and should not be construed as being limited to the embodiments set forth herein; rather, that alternate embodiments included in other retrogressive inventions or falling within the spirit and scope of the present disclosure will fully convey the concept of the invention to those skilled in the art.

FIG. 1 is a perspective view of a refrigerator according to an embodiment, FIG. 2 is a partial view of the refrigerator according to an embodiment, and FIG. 3 is a view illustrating rear components of the refrigerator according to an embodiment.

Referring to FIGS. 1 to 3, a refrigerator 10 according to the current embodiment includes a main body 11 defining a storage compartment. The storage compartment includes a refrigerating compartment 20 and a freezing compartment 30. For example, the refrigerating compartment 20 may be disposed above the freezing compartment 30. However, the present disclosure is not limited to the positions of the refrigerating compartment 20 and the freezing compartment 30.

The refrigerating compartment and the freezing compartment may be partitioned by a partition wall 28.

The refrigerator 10 includes a refrigerating compartment door 25 for opening or closing the refrigerating compartment 20 and a freezing compartment door 35 for opening or closing the freezing compartment 30. The refrigerating compartment door 25 may be hinge-coupled to the main body 10 to rotate, and the freezing compartment door 35 may be provided in a drawer type and thus be withdrawable forward.

Also, the main body 11 includes an outer case 12 defining an exterior of the refrigerator 10 and an inner case 13 disposed inside the outer case 12 to define at least one portion of an inner surface of the refrigerating compartment 20 or freezing compartment 30.

A cool air discharge part 22 for discharging cool air into the refrigerating compartment 20 may be disposed in a rear wall of the refrigerating compartment 20. Although not shown, a cool air discharge part for discharging cool air into the freezing compartment 30 may be disposed in a rear wall of the freezing compartment 30.

The refrigerator 10 includes a plurality of evaporators 150 and 160 for independently cooling the refrigerating compartment 20 and the freezing compartment 30. The plurality of evaporators 150 and 160 include a first evaporator 150 for cooling one storage compartment of the refrigerating compartment 20 and the freezing compartment 30 and a second evaporator for cooling the other storage compartment.

For example, the first evaporator 150 may function as a refrigerating compartment evaporator for cooling the refrigerating compartment 20, and the second evaporator 160 may function as a freezing compartment evaporator for cooling the freezing compartment 30. Also, since the refrigerating compartment 20 is disposed above the freezing compartment 30 in the current embodiment, the first evaporator 150 may be disposed above the second evaporator 160.

The first evaporator 150 may be disposed at a rear side of the rear wall of the refrigerating compartment 20, and the second evaporator 160 may be disposed at a rear side of the rear wall of the freezing compartment 30. The cool air generated in the first evaporator 150 may be supplied into the refrigerating compartment 20 through the refrigerating compartment cool air discharge part 22, and the cool air generated in the second evaporator 160 may be supplied into the freezing compartment 30 through the freezing compartment cool air discharge part.

The first evaporator 150 includes a first refrigerant tube 151 in which the refrigerant flows, a first fin 152 coupled to the first refrigerant tube 151 to increase a heat-exchange area between the refrigerant and a fluid, and a first fixing bracket 153 fixing the first refrigerant tube 151. The first fixing bracket 153 may be provided in plurality on both sides of the refrigerant tube 151.

The second evaporator 160 includes a second refrigerant tube 161 in which the refrigerant flows, a second fin 162 coupled to the second refrigerant tube 161 to increase a heat-exchange area between the refrigerant and the fluid, and a second fixing bracket 163 fixing the second refrigerant tube 161. The second fixing bracket 163 may be provided in plurality on both sides of the second refrigerant tube 161.

The first and second refrigerant tubes 151 and 161 may be bent in one direction and the other direction, respectively. The first and second fixing brackets 153 and 163 may be fixed to both sides of the first and second refrigerant tubes 151 and 161 to prevent the first and second refrigerant tubes from being shaken, respectively. For example, the first and second refrigerant tubes 151 and 161 may be disposed to pass through the first and second fixing brackets 153 and 163, respectively.

A gas/liquid separator 170 for filtering a liquid refrigerant of the refrigerant evaporated in the first and second evaporators 150 and 160 to supply a gaseous refrigerant into first and second compressors 111 and 115 may be disposed at a side of each of the first and second evaporators 150 and 160.

A machine room 50 in which main components of the refrigerator are disposed may be defined in a rear lower portion of the refrigerator 10, i.e., a rear side of the freezing compartment 30. For example, the compressor and the condenser are disposed in the machine room 50.

In detail, referring to FIG. 3, the plurality of compressors 111 and 115 for compressing the refrigerant and the condenser (see reference numeral 120 of FIG. 4) for condensing the refrigerant compressed in the plurality of compressors 111 and 115 are disposed in the machine room 50. The plurality of compressors 111 and 115 and the condenser 120 may be placed on a base 51 of the machine room 50. The base 51 may define a bottom surface of the machine room 50.

Also, a valve device 130 that is capable of adjusting a flow direction of the refrigerant to supply the refrigerant into the first and second evaporators 150 and 160 may be disposed in the machine room 50.

An amount of refrigerant introduced into the first and second evaporators 150 and 160 may vary according to the control of the valve device 130. In other words, refrigerant concentration into one evaporator of the first and second evaporators 150 and 160 may occur. The valve device 130 may include a four-way valve.

A dryer 180 for removing moisture or impurities contained in the refrigerant condensed in the condenser 120 may be disposed in the machine room 50. The dryer 180 may temporally store the liquid refrigerant introduced therein. The refrigerant passing through the dryer 180 may be introduced into the valve device 130.

FIG. 4 is a view of a system having a refrigeration cycle in the refrigerator according to an embodiment.

Referring to FIG. 4, the refrigerator 10 according to the current embodiment includes a plurality of devices for driving a refrigeration cycle.

In detail, the refrigerator 10 includes the plurality of compressors 111 and 115 for compressing a refrigerant, the condenser 120 for condensing the refrigerant compressed in the plurality of compressors 111 and 115, a plurality of expansion devices 141, 143, and 145 for decompressing the refrigerant condensed in the condenser 120, and the plurality of evaporators 150 and 160 for evaporating the refrigerant decompressed in the plurality of expansion devices 141, 143, and 145.

Also, the refrigerator 10 includes a refrigerant tube 100 connecting the plurality of compressors 111 and 115, the condenser 120, the expansion devices 141, 143, and 145, and the evaporators 150 and 160 to each other to guide a flow of the refrigerant.

The plurality of compressors 111 and 115 include a second compressor 115 disposed at a low-pressure side and a first compressor 111 for further compressing the refrigerant compressed in the second compressor 115.

The first compressor 111 and the second compressor 115 are connected to each other in series. That is, an outlet-side refrigerant tube of the second compressor 115 is connected to an inlet-side of the first compressor 111.

The plurality of evaporators 150 and 160 includes a first evaporator 150 for generating cool air to be supplied into one storage compartment of the refrigerating compartment and the freezing compartment and a second evaporator 160 for generating cool air to be supplied into the other storage compartment.

For example, the first evaporator 150 may generate cold air to be supplied into the refrigerating compartment and be disposed on one side of the refrigerating compartment. Also, the second evaporator 160 may generate cold air to be supplied into the freezing compartment and be disposed on one side of the freezing compartment.

The cool air to be supplied into the freezing compartment may have a temperature less than that of the cool air to be supplied into the refrigerating compartment. Thus, a refrigerant evaporation pressure of the second evaporator 160 may be less than that of the first evaporator 150.

An outlet-side refrigerant tube 100 of the second evaporator 160 may extend to an inlet-side of the second compressor 115. Thus, the refrigerant passing through the second evaporator 160 may be introduced into the second compressor 115.

The outlet-side refrigerant tube 100 of the first evaporator 150 may be connected to the outlet-side refrigerant tube of the second compressor 115. Thus, the refrigerant passing through the first evaporator 150 may be mixed with the refrigerant compressed in the second compressor 115, and then the mixture may be suctioned into the first compressor 111.

The plurality of expansion devices 141, 143, and 145 include first and third expansion devices 141 and 145 for expanding the refrigerant to be introduced into the first evaporator 150 and a second expansion device 143 for expanding the refrigerant to be introduced into the second evaporator 160. Each of the first to third expansion devices 141, 143, and 145 may include a capillary tube.

A plurality of refrigerant passages 101 and 105 for guiding the introduction of the refrigerant into the first evaporator 150 may be defined in the inlet-side of the first evaporator 150.

The plurality of refrigerant passages 101 and 105 include a first refrigerant passage 101 in which the first expansion device 141 is disposed and a third refrigerant passage 105 in which the third expansion device 145 is disposed. The first and third refrigerant passages 101 and 105 may be called a "first evaporation passage" in that the first and third refrigerant passages 101 and 105 guide the introduction of the refrigerant into the first evaporator 150. The refrigerants flowing into the first and third refrigerant passages 101 and 105 may be mixed with each other and then be introduced into the first evaporator 150.

Also, a second refrigerant passage 103 for guiding the introduction of the refrigerant into the second evaporator 160 is defined in an inlet-side of the second evaporator 160. The second expansion device 143 may be disposed in the second refrigerant passage 103. The second refrigerant passage 103 may be called a "second evaporation passage" in that the second refrigerant passage 103 guides the introduction of the refrigerant into the second evaporator 160.

The first to third refrigerant passages 101, 103, and 105 may be understood as "branch passages" that are branched from the refrigerant tube 100.

The refrigerator 10 may further include the valve device 130 for dividing and introducing the refrigerant into at least two refrigerant passages of the first to third refrigerant passages 101, 103, and 105. The valve device 130 may be understood as a device for simultaneously operating the first and second evaporators 150 and 160, i.e., for adjusting a flow of the refrigerant so that the refrigerant is introduced into the first and second evaporators 150 and 160 at the same time.

The valve device 130 includes a four-way valve having one inflow part through which the refrigerant is introduced and three discharge parts through which the refrigerant is discharged.

The three discharge parts of the valve device 130 are connected to the first to third expansion devices 141, 143, and 145, respectivley. Thus, the refrigerant passing through the valve device 130 may be branched and discharged into the first to third expansion devices 141, 143, and 145.

The valve device 130 includes three discharge parts 135a, 135b, and 135c (see FIG. 6) connected to the first to third expansion devices 141, 143, and 145. The three discharge parts 135a, 135b, and 135c include a first discharge part 135a, a second discharge part 135b, and a third discharge part 135c.

At least two discharge parts of the three discharge parts may be opened. For example, when all of the three discharge parts 135a, 135b, and 135c are opened, the refrigerant may flow through all of the first to third expansion devices 141, 143, and 145. On the other hand, when the first and second discharge parts 135a and 135b are opened, and the third discharge part 135c is closed, the refrigerant may flow through the first and second expansion devices 141 and 143. As described above, a flow path of the refrigerant may vary according to the control of the valve device 130.

The valve device 130 may be controlled so that the refrigerant concentration into one evaporator occurs on the basis of whether the refrigerant is sufficient or insufficient in the first or second evaporator 150 or 160 when the first and second evaporators 150 and 160 operate at the same time.

For example, if the refrigerant in the first evaporator 150 is insufficient, i.e., the cooling of the refrigerating compartment in which the first evaporator 150 is disposed is further required, the valve device 130 may operate to open all of the three discharge parts 135a, 135b, and 135c.

When all of the three discharge parts 135a, 135b, and 135c are opened, a more amount of refrigerant may flows into the inlet-side of the first evaporator 150 than the inlet-side of the second evaporator 160. Thus, a relatively large amount of refrigerant may flow into the first evaporator 150 than the second evaporator 160. As a result, the refrigerant concentration into the first evaporator 150, for example, the refrigerant compartment evaporator 150 may occur.

On the other hand, if the refrigerant in the second evaporator 160 is insufficient, i.e., the cooling of the refrigerating compartment in which the second evaporator 160 is disposed is further required, the third discharge part 135c may be closed, and the first and second discharge parts 135a and 135b may be opened.

When the first and second discharge parts 135a and 135b are opened, one refrigerant passage may be defined in each of the inlet-sides of the first and second evaporators 150 and 160. Thus, when compared that all of the three discharge parts 135a, 135b, and 135c are opened, an amount of refrigerant introduced into the second evaporator 160 may relatively increase. As a result, the refrigerant concentration into the first evaporator 160, for example, the freezing compartment-side evaporator 160 may occur.

Also, to more easily realize the refrigerant concentration into the second evaporator 160, the second expansion device 143 may have a diameter greater than that of the first expansion device 141.

Also, to more easily realize the refrigerant concentration into the second evaporator 160, the valve device 130 may be installed to be inclined from the first discharge part 135a connected to the first expansion device 141 to the second discharge part 135b connected to the second expansion device 143. In this case, the second discharge part 135b may have a height less than that of the first discharge part 135a connected to the first expansion device 141.

The refrigerator 10 includes blower fans 125, 155, and 165 disposed on one side of the heat exchanger to blow air. The blower fans 125, 155, and 165 includes a condensation fan 125 provided on one side of the condenser 120, a first evaporation fan 155 provided on one side of the first evaporator 150, and a second evaporation fan 165 provided on one side of the second evaporator 160.

Each of the first and second evaporators 150 and 160 may vary in heat-exchange performance according to a rotation rate of each of the first evaporation fans 155 and 165. For example, if a large amount of refrigerant is required according to the operation of the evaporator 150, the first evaporation fan 155 may increase in rotation rate. Also, if cool air is sufficient, the first evaporation fan 155 may be reduced in rotation rate.

FIG. 5 is a view of a valve device according to an embodiment, FIG. 6 is a cross-sectional view taken along line I-I' of FIG. 5, and FIG. 7 is a view illustrating a state in which the valve device is installed at a preset inclination according to an embodiment.

Referring to FIGS. 5 to 7, the valve device 130 according to an embodiment includes a valve body 131, an inflow tube 100a disposed in one side of the valve body 131, and a tube connection part 133 connecting the three expansion devices 141, 143, and 145 to each other.

For example, the tube connection part 133 is disposed under the valve body 131, and the three expansion devices 141, 143, and 145 may extend downward from the tube connection part 133.

A passage switching device for switching a passage for the refrigerant may be disposed in the valve body 131.

The tube connection part 133 includes an inflow guide part 134 connected to the inflow tube 100a and a discharge guide part 135 connected to the three expansion devices 141, 143, and 145.

Also, the discharge guide part 135 includes a first discharge part 135a connected to the first expansion device 141, a second discharge part 135b connected to the second expansion device 143, and a third discharge part 135c connected to the third expansion device 145.

The refrigerant passing through the dryer 180 may be introduced into the valve device 130 through the inflow tube 100a and the inflow guide part 134. Also, the refrigerant may be discharged through at least two discharge parts opened by the passage switching device of the valve body 131.

Here, the refrigerant flows through the expansion devices 141, 143, and 145 connected to the opened discharge part. For example, when all of the first to third discharge parts 135a, 135b, and 135c are opened, the refrigerant discharged from the valve device 130 flows through the first to third expansion devices 141, 143, and 145. On the other hand, when the first and second discharge parts 135a and 135b are opened, the refrigerant discharged from the valve device 130 may flow through the first and second expansion devices 141 and 143.

Referring to FIG. 7, the valve device 130 may be disposed inclined in one direction (in a right direction in FIG. 7) within the machine room 50. In detail, the valve device 130 may be disposed inclined at a predetermined angle (about 90°-α) with respect to the base 51 of the machine room 50.

In detail, the inclined direction of the valve device 130 may correspond to a direction in which the valve device 130 is inclined toward the second expansion device 143 or the second discharge part 135b with respect to a virtual line l1 that is perpendicular to the base 51. That is, the second expansion device 143 may be inclined at a preset angle α with respect to the virtual line l1.

In this case, a distance H2 between a central portion of the second discharge part 135b connected to the second expansion device 143 and the base 51 may be less than that H1 between a central portion of the first discharge part 135a connected to the first expansion device 141 and the base 51.

For example, the predetermined angle α may be defined as an angle of about 0° to about 20°.

As described above, in a case where the valve device 130 is inclined at a preset angle in a direction of the second discharge part 135b or the second expansion device 143, when the first and second expansion devices 141 and 143 are opened to realize the refrigerant concentration into the second evaporator 160, a more amount of refrigerant may flow toward the second expansion device 143.

Hereinafter, a diameter of the expansion device for smoothly realizing the refrigerant concentration into the first or second evaporator 150 or 160 when the refrigerating compartment and freezing compartment operate at the same time will be described.

FIG. 8 is a block diagram of the refrigerator according to an embodiment.

Referring to FIG. 8, the refrigerator 10 according to the current embodiment includes a plurality of temperature sensors 210, 220, 230, and 240 for detecting inlet or outlet temperatures of each of the first and second evaporators 150 and 160.

The plurality of temperature sensors 210, 220, 230, and 240 include a first inlet temperature sensor 210 for detecting an inlet-side temperature of the first evaporator 150 and a first outlet temperature sensor 220 for detecting an outlet-side temperature of the first evaporator 150.

Also, the plurality of temperature sensors 210, 220, 230, and 240 include a second inlet temperature sensor 230 for detecting an inlet-side temperature of the second evaporator 160 and a second outlet temperature sensor 240 for detecting an outlet-side temperature of the second evaporator 160.

The refrigerator 10 may further include a control unit 200 for controlling an operation of a valve device 130 on the basis of the temperatures detected by the plurality of temperature sensors 210, 220, 230, and 240.

To perform cooing operations of the refrigerating and freezing compartments at the same time, the control unit 200 may control operations of the first and second compressors 111 and 115, the condensation fan 125, and the first and second evaporation fans 155 and 165.

Whether the refrigerant is concentrated may be determined on the basis of information with respect to inlet/output temperatures of the first evaporator 150 and information with respect to inlet/output temperatures of the second evaporator 160.

As an example of the determination method, it may be determined whether the refrigerant is concentrated according to whether the inlet/outlet temperature difference of the first evaporator 150 is equal to or greater or less than a preset reference valve.

The refrigerant circulating through the refrigeration cycle may be branched into the first and second evaporators 150 and 160 through the valve device 130 to flow. Thus, when the inlet/outlet temperature difference of the first evaporator 150 is detected, a rate of the refrigerant passing through the first evaporator 150 may be recognized. Here, a rate of the refrigerant passing through the second evaporator 160 may be recognized on the basis of the rate of the refrigerant passing through the first evaporator 160.

For example, when the inlet/outlet temperature difference of the first evaporator 150 is greater than the reference value, it may be determined that an amount of refrigerant is lack. On the other hand, it may be recognized that an amount of refrigerant flowing into the second evaporator 160 is relatively large.

As another example of the determination method, it may be determined whether the refrigerant is concentrated into one side according to whether the inlet/outlet temperature difference of the first evaporator 150 is equal to or is greater or less than a first set valve. For example, the first set value may be 1.

When a ratio of the inlet/outlet temperature difference of the first evaporator 150 to the inlet/outlet temperature difference of the second evaporator 160 is 1, i.e., the inlet/outlet temperature differences of the first and second evaporators 150 and 160 are the same, it may be determined that the refrigerant concentration does not occur in the first or second evaporator 150 or 160.

On the other hand, when a ratio of the inlet/outlet temperature difference of the first evaporator 150 to the inlet/outlet temperature difference of the second evaporator 160 is greater than 1, i.e., the inlet/outlet temperature difference of the first evaporator 150 is greater than that of the second evaporator 160, it may be determined that the refrigerant concentration does not occur in the second evaporator 160.

Also, when a ratio of the inlet/outlet temperature difference of the first evaporator 150 to the inlet/outlet temperature difference of the second evaporator 160 is greater than 1, i.e., the inlet/outlet temperature difference of the first evaporator 150 is greater than that of the second evaporator 160, it may be determined that the refrigerant concentration does not occur in the second evaporator 150.

As further another example of the determination method, it may be determined whether the refrigerant is concentrated into one side according to whether an inlet/outlet temperature difference between the first evaporator 150 and the second evaporator 160 is equal to or is greater or less than a second set valve. For example, the first set value may be 0.

When a value obtained by subtracting the inlet/outlet temperature difference of the second evaporator 160 from the inlet/outlet temperature difference of the first evaporator 150 is 0, i.e., the inlet/outlet temperature differences of the first and second evaporators 150 and 160 are the same, it may be determined that the refrigerant concentration does not occur in the first or second evaporator 150 or 160.

On the other hand, when a ratio of the inlet/outlet temperature difference of the first evaporator 150 to the inlet/outlet temperature difference of the second evaporator 160 is greater than 1, i.e., the inlet/outlet temperature difference of the first evaporator 150 is greater than that of the second evaporator 160, it may be determined that the refrigerant concentration does not occur in the second evaporator 160.

Also, when a ratio of the inlet/outlet temperature difference of the first evaporator 150 to the inlet/outlet temperature difference of the second evaporator 160 is less than 0, i.e., the inlet/outlet temperature difference of the first evaporator 150 is less than that of the second evaporator 160, it may be determined that the refrigerant concentration does not occur in the first evaporator 150.

Whether the refrigerant concentration into the first or second evaporator 150 or 160 sufficiently occurs may be recognized by using one of the above-described three examples of the determination methods.

For example, in another example, when the ratio (hereinafter, referred to as a ratio value or ER) of the inlet/outlet temperature difference of the first evaporator 150 to the inlet/outlet temperature difference of the second evaporator 160 is less than 1, it may be recognized that an occurrence of the refrigerant concentration into the second evaporator 160 starts. Also, the radio is less than 0.5, it may be recognized that the refrigerant concentration into the second evaporator 160 sufficiently occurs.

On the other hand, if the ER is greater than 1, it may be recognized that an occurrence of refrigerant concentration into the first evaporator 150 starts. Also, if the ER is greater than 2, it may be recognized that the refrigerant concentration into the first evaporator 150 sufficiently occurs.

In the current embodiment, to secure the ER to a value of 2 or more so as to realize the refrigerant concentration into the first evaporator 150 and secure the ER to a value of 0.5 or less so as to the refrigerant concentration into the second evaporator 160, several tests for deriving an optimum range with respect to a diameter of each of the first to third expansion devices 141, 143, and 145. The test results are shown in Tables 1 to 3 below.

TABLE 1

| Open firs to third expansion devices(Diameter of third expansion device: A1, Diameter ratio: B1) | | Installation of valve device at inclination of 9° |
|---|---|---|
| A1: 0.70 mm B1: 1.83 | Ratio valve (ER) | 1.6 |
| | Power consumption (kwh) | 57.4 |
| A1: 0.75 mm B1: 1.89 | Ratio valve (ER) | 6.5 |
| | Power consumption (kwh) | 58.8 |
| A1: 0.80 mm B1: 1.96 | Ratio valve (ER) | 8.9 |
| | Power consumption (kwh) | 59.1 |
| A1: 0.85 mm B1: 2.03 | Ratio valve (ER) | 9.6 |
| | Power consumption (kwh) | 59.2 |
| A1: 0.90 mm B1: 2.09 | Ratio valve (ER) | 11.9 |
| | Power consumption (kwh) | 60.9 |

Table 1 above shows experimental values with respect to a variation in ratio value (ER) and power consumption according to a diameter of the third expansion device 145 when the first to third expansion devices 141, 143, and 145 operate to be opened in a state where the valve device 130 is disposed inclined at an angle of about 9° toward the second expansion device 143.

In experimental conditions, the first expansion device 141 has a diameter of about 0.67 mm, and the second expansion device 143 has a diameter of about 0.75 mm that is greater than that of the first expansion device 141.

Also, a diameter ratio B1 may be understood as a value that is obtained by dividing the sum of the diameter of the first expansion device 141 and the diameter A1 of the third expansion device by a diameter of the second expansion device 143.

When the first to third expansion devices 141, 143, and 145 are opened, the refrigerant concentration into the first evaporator 150 may occur as described above. Also, the more the ratio value ER increases, the more the refrigerant concentration into the first evaporator 150 increases. Thus, when the power consumption is less, this may be effective.

When the third expansion device 145 has a diameter A1 of about 0.70 mm that is less than that of the second expansion device 143, the ratio value ER may be about 1.6. In this case, although the refrigerant concentration into the first evaporator 150 occurs, it may be difficult to reach a desired level (ER is about 2.0 or more).

On the other hand, when the diameter A1 is greater than that of the second expansion device 143, i.e., is about 0.75 mm, 0.80 mm, 0.85 mm, or 0.90 mm, the ratio value exceeds about 2. In this case, the refrigerant concentration into the first evaporator 150 may sufficiently occur. Thus, the cooling of the storage compartment in which the first evaporator 150 is disposed, for example, the refrigerating compartment may be effectively realized.

As a result, when the test is performed in a state where the diameter of each of the first and second expansion devices 141 and 143 is fixed, and the diameter of the third expansion device 145 varies, if the diameter ratio B1 is above 1.89, a sufficient ratio value ER may be obtained.

However, when the third expansion device 145 has a diameter of about 0.90 mm, since the power consumption of about 60.9 kwh is required, it is sent that the power consumption increases. Thus, according to the above-described test, it may be proposed that the third expansion device 145 has a diameter A1 of about 0.75 mm to about 0.85 mm and a diameter ratio B1 of about 1.89 to about 2.03.

TABLE 2

| Open firs to third expansion devices(Diameter of third expansion device: A2, Diameter ratio: B2) | | Installation of valve device at inclination of 15° |
|---|---|---|
| A2: 0.70 mm  B2: 1.87 | Ratio valve (ER) | 1.6 |
|  | Power consumption (kwh) | 57.1 |
| A2: 0.75 mm  B2: 1.93 | Ratio valve (ER) | 5.8 |
|  | Power consumption (kwh) | 58.2 |
| A2: 0.80 mm  B2: 2.00 | Ratio valve (ER) | 7.5 |
|  | Power consumption (kwh) | 58.7 |
| A2: 0.85 mm  B2: 2.07 | Ratio valve (ER) | 5.9 |
|  | Power consumption (kwh) | 59.2 |
| A2: 0.90 mm  B2: 2.13 | Ratio valve (ER) | 6.4 |
|  | Power consumption (kwh) | 60.0 |

Table 1 above shows experimental values that are obtained through a method similar to that of Table 1. Thus, the descriptions with respect to Table 1 may be quoted.

However, in experimental conditions, the first expansion device 141 has a diameter of about 0.70 mm, and the second expansion device 143 has a diameter of about 0.75 mm that is greater than that of the first expansion device 141. Also, the valve device 130 may be disposed inclined at an angle of about 15° toward the second expansion device 143, which is in the range of the inclined angle that is proposed in the above-described description.

When the third expansion device 145 has a diameter A2 of about 0.70 mm that is less than that of the second expansion device 143, the ratio value ER may be about 1.6. In this case, although the refrigerant concentration into the first evaporator 150 occurs, it may be difficult to reach a desired level (ER is about 2.0 or more).

On the other hand, when the diameter A2 is greater than that of the second expansion device 143, i.e., is about 0.75 mm, 0.80 mm, 0.85 mm, or 0.90 mm, the ratio value exceeds about 2. In this case, the refrigerant concentration into the first evaporator 150 may sufficiently occur. Thus, the cooling of the storage compartment in which the first evaporator 150 is disposed, for example, the refrigerating compartment may be effectively realized.

As a result, when the test is performed in a state where the diameter of each of the first and second expansion devices 141 and 143 is fixed, and the diameter of the third expansion device 145 varies, if the diameter ratio B is above 1.93, a sufficient ratio value ER may be obtained.

However, when the third expansion device 145 has a diameter of about 0.90 mm, since the power consumption of about 60.0 kwh is required, it is sent that the power consumption increases. Thus, according to the above-described test, it may be proposed that the third expansion device 145 has a diameter of about 0.75 mm to about 0.85 mm and a diameter ratio B of about 1.93 to about 2.07.

TABLE 3

| Open firs to third expansion devices(Diameter of third expansion device: A3, Diameter ratio: B3) | | Installation of valve device at inclination of 9° |
|---|---|---|
| A3: 0.70 mm  B3: 1.93 | Ratio valve (ER) | 0.9 |
|  | Power consumption (kwh) | 56.7 |
| A3: 0.75 mm  B3: 2.00 | Ratio valve (ER) | 9.1 |
|  | Power consumption (kwh) | 59.1 |
| A3: 0.80 mm  B3: 2.07 | Ratio valve (ER) | 9.3 |
|  | Power consumption (kwh) | 60.2 |

Table 3 above shows experimental values that are obtained through a method similar to that of Table 1. Thus, the descriptions with respect to Table 1 may be quoted.

However, in experimental conditions, each of the first and second expansion devices 141 and 143 has a diameter of about 0.75 mm. Also, the valve device 130 may be disposed inclined at an angle of about 12° toward the second expansion device 143, which is in the range of the inclined angle that is proposed in the above-described description.

When the third expansion device 145 has a diameter A3 of about 0.70 mm that is less than that of the second expansion device 143, the ratio value ER may be about 0.9. In this case, the refrigerant concentration into the first evaporator 150 may be restricted.

On the other hand, when the diameter A3 is greater than that of the second expansion device 143, i.e., is about 0.75 mm or 0.80 mm, the ratio value exceeds about 2. In this case, the refrigerant concentration into the first evaporator 150 may sufficiently occur. Thus, the cooling of the storage compartment in which the first evaporator 150 is disposed, for example, the refrigerating compartment may be effectively realized.

As a result, when the test is performed in a state where the diameter of each of the first and second expansion devices 141 and 143 is fixed, and the diameter of the third expansion device 145 varies, if the second expansion device 143 has a diameter of about 0.75 mm to about 0.80 mm, and the diameter ratio B3 is above 2, a sufficient ratio value ER may be obtained.

However, when the third expansion device 145 has a diameter of about 0.80 mm, since the power consumption of about 60.2 kwh is required, it is sent that the power consumption increases. Thus, according to the above-described test, it may be proposed that the third expansion device 145 has a diameter of about 0.75 mm and a diameter ratio B of about 2.00 to about 2.07.

As seen by the experimental values shown in Tables 1 to 3, when the third expansion device 145 has diameters A1, A2, and A3 that are less than that of the second expansion device 143, it may be difficult to secure the ratio value ER having a desired level. In the current embodiment, the third expansion device 145 may have a diameter greater than that of the second expansion device 143.

Also, the optimal value with respect to the diameter of the expansion device, which is derived from each of the tests will be summarized.

Referring to Table 1, when the first expansion device 141 has a diameter of about 0.67 mm, and the second expansion device 143 has a diameter of about 0.75 mm, the third expansion device 145 may have a diameter ranging from about 0.75 mm to about 0.85 mm. Here, a diameter ratio may range from about 1.89 to about 2.03.

Referring to Table 2, when the first expansion device 141 has a diameter of about 0.70 mm, and the second expansion device 143 has a diameter of about 0.75 mm, the third expansion device 145 may have a diameter ranging from about 0.75 mm to about 0.85 mm. Here, a diameter ratio may range from about 1.93 to about 2.07.

Referring to Table 3, when the first and second expansion devices 141 and 143 have the same diameter of about 0.75 mm, the third expansion device 145 may have a diameter ranging from about 0.75 mm to about 0.80 mm. Here, a diameter ratio may range from about 2.00 to about 2.07.

In summary, whether the refrigerant concentration occurs was observed according to a specific value with respect to a diameter of each of the first to third expansion devices 141, 143, and 145 in the above-described tests. In consideration of the tendency of the experimental value in Tables 1 to 3, it is seen that the refrigerant concentration is easily realized when the diameter ratio of the first to third expansion devices 141, 143, and 145 ranges from about 1.89 to about 2.07.

INDUSTRIAL APPLICABILITY

According to the proposed embodiments, since the evaporators disposed in the refrigerating compartment and the freezing compartment operates at the same time, the simultaneous cooling of the refrigerating compartment and the freezing compartment may be effectively realized, and thus, its industrial availability is very high.

The invention claimed is:

1. A refrigerator comprising:
a main body comprising a refrigerating compartment and a freezing compartment;
a machine room defined in a lower portion of the main body and in which a base is disposed;
a plurality of compressors placed on the base to compress a refrigerant, the plurality of compressors including a first compressor and a second compressor, the second compressor provided at a low pressure side and the first compressor configured to further compress the refrigerant compressed in the second compressor;
a condenser placed on the base and disposed at one side of the compressor;
a valve device into which the refrigerant condensed in the condenser is introduced, the valve device comprising a plurality of discharge parts including a first discharge part, a second discharge part, and a third discharge part to discharging the refrigerant;
a plurality of expansion devices connected to the plurality of discharge parts, the plurality of expansion devices including a first expansion device connected to the first discharge part, a second expansion device connected to the second discharge part, and a third expansion device connected to the third discharge part; and
a plurality of evaporators comprising a first evaporator connected to the first and the third expansion devices and a second evaporator connected to the second expansion device,
wherein the valve device is disposed inclined at a predetermined angle from the first discharge part towards the second discharge part with respect to a virtual line that is perpendicular to the base such that the second discharge part has a height less than that of the first discharge part with respect to the base.

2. The refrigerator according to claim 1, wherein the first evaporator is configured to cool the refrigerating compartment, and
the second evaporator is configured to cool the freezing compartment.

3. The refrigerator according to claim 1, wherein the predetermined angle ranges from about 0° to about 20°.

4. The refrigerator according to claim 1, wherein the second expansion device has a diameter greater than that of the first expansion device.

5. The refrigerator according to claim 1, wherein the third expansion device has a diameter greater than that of the second expansion device.

6. The refrigerator according to claim 1, wherein a value obtained by dividing the sum of diameters of the first and third expansion devices by a diameter of the second expansion device ranges from about 1.89 to about 2.07.

7. The refrigerator according to claim 6, wherein, when the first expansion device has a diameter of about 0.67 mm, and the second expansion device has a diameter of about 0.75 mm, the third expansion device has a diameter ranging from about 0.75 mm to about 0.85 mm.

8. The refrigerator according to claim 6, wherein, when the first expansion device has a diameter of about 0.70 mm, and the second expansion device has a diameter of about 0.75 mm, the third expansion device has a diameter ranging from about 0.75 mm to about 0.85 mm.

9. The refrigerator according to claim 6, wherein, when each of the first and second expansion devices has a diameter of about 0.75 mm, the third expansion device has a diameter ranging from about 0.75 mm to about 0.80 mm.

10. The refrigerator according to claim 1, further comprising:
a first inlet temperature sensor detecting an inlet temperature of the first evaporator;
a first outlet temperature sensor detecting an outlet temperature of the first evaporator;
a second inlet temperature sensor detecting an inlet temperature of the second evaporator; and
a second outlet temperature sensor detecting an outlet temperature of the second evaporator.

11. The refrigerator according to claim 10, further comprising a control unit for recognizing whether refrigerant concentration into the first or second evaporator occurs based on a ratio of a difference between the temperatures detected by the first inlet temperature sensor and the first outlet temperature sensor to a difference between the temperatures detected by the second inlet temperature sensor and the second outlet temperature sensor.

12. The refrigerator according to claim 1, wherein at least one of the plurality of expansion devices comprises a capillary tube.

13. A refrigerator comprising:

a main body comprising a refrigerating compartment and a freezing compartment;

a machine room defined in a lower portion of the main body and in which a base is disposed;

a compressor placed on the base to compress a refrigerant;

a condenser placed on the base and disposed at one side of the compressor;

a valve device disposed inclined in a predetermined direction with respect to the base, the valve device comprising the valve device including a plurality of discharge parts including a first discharge part, a second discharge part, and a third discharge part to discharge the refrigerant;

first, second, and third capillary tubes, the first and third capillary tubes connected to the first discharge part and the third discharge part of the plurality of discharge parts;

the second capillary tube connected to the second discharge part of the plurality of discharge parts;

an evaporator for the refrigerating compartment, which is connected to the first and the third capillary tubes; and an evaporator for the freezing compartment, which is connected to the second capillary tube, wherein the first capillary tube has a diameter less than that of the second capillary tube; and the third capillary tube has a diameter greater than that of the second capillary tube, and the valve device is inclined at a predetermined angle from the first discharge part towards the second discharge part with respect to a virtual line that is perpendicular to the base such that the second discharge part has a height less than that of the first discharge part with respect to the base.

14. The refrigerator according to claim 13, wherein a value obtained by dividing the sum of diameters of the first and third capillary tubes by a diameter of the second capillary tube ranges from about 1.89 to about 2.07.

* * * * *